United States Patent [19]
Villella

[11] 3,905,344
[45] Sept. 16, 1975

[54] INTERNAL COMBUSTION ENGINE

[76] Inventor: Tony R. Villella, 3106 Hewitt Ave., Everett, Wash. 98201

[22] Filed: Jan. 11, 1974

[21] Appl. No.: 432,662

Related U.S. Application Data

[63] Continuation-in-part of Ser. No. 353,341, April 23, 1973.

[52] U.S. Cl. ............................ 123/75 C; 123/119 A
[51] Int. Cl.. F02m 25/06; F02b 75/02; F02d 39/02
[58] Field of Search ...................... 123/119 A, 75 C

[56] References Cited
UNITED STATES PATENTS

| | | | |
|---|---|---|---|
| 1,052,340 | 2/1913 | Holst................................ | 123/75 C |
| 1,579,425 | 4/1976 | Wilson.............................. | 123/75 C |
| 1,933,619 | 11/1933 | Edwards .......................... | 123/119 A |
| 2,239,262 | 4/1941 | Violet ............................. | 123/75 C X |
| 2,701,556 | 2/1955 | Woerner.......................... | 123/119 A |
| 3,470,857 | 10/1969 | Stivender......................... | 123/119 A |
| 3,579,981 | 5/1971 | Gau .................................. | 123/119 A |
| 3,583,375 | 6/1971 | Pischinger....................... | 123/119 A |
| 3,682,151 | 8/1972 | Tatsutomi....................... | 123/119 A |

*Primary Examiner*—Wendell E. Burns

[57] ABSTRACT

A four-cycle internal combustion engine having a cylinder provided with a head end and a crank case end with a fuel inlet in the head end an exhaust outlet opening in the cylinder wall in position to be passed by the pistons and spaced from the head end of the cylinder a distance equal to a major portion of the stroke of the piston in the cylinder, the disclosure also including an exhaust valve in the head end of the cylinder communicating with an exhaust recycling conduit adapted to recycle exhaust gases into an intake manifold, and a flow valve intercommunicating with said exhaust gas recycling conduit and said intake manifold for coordinating or modulating flow of recycled exhaust gases into the intake manifold in relation to fuel being conducted to said fuel inlet valve in the head end of said cylinder. Also disclosed is an engine similar to the foregoing wherein the first mentioned exhaust outlet opening is provided with an exhaust valve held closed in spring loaded relation with said outlet opening and so adjusted as atmosphere provide an exhaust outflow to atmospheric according to combustion pressure in the cylinder when the piston passes to a position near the end of its stroke. The disclosure also relating to a second conduit communicating with said gas recycling conduit, said second conduit communicating with an exhaust manifold disposed to receive exhaust gases from said exhaust gas outlet opening, said second conduit adapted to conduct part of the exhaust gases from said exhaust valve in the head end of said cylinder to said exhaust manifold whereby a portion of the exhaust gases passing from said exhaust valves are mixed with the hot gases passing from said exhaust gas outlet and are thereby burned in said exhaust manifold.

8 Claims, 16 Drawing Figures

INTERNAL COMBUSTION ENGINE

This application is a continuation in part of my copending application for Internal Combustion Engine, Ser. No. 353,341 filed Apr. 23, 1973.

The disclosure also relates to a novel method for operating a four-cycle internal combustion engine and exhausting hot efficiently burned products of combustion to atmosphere via an exhaust manifold and recycling some of the inefficiently burned products of combustion to the intake manifold for mixture with incoming fuel for reintroduction into the combustion chambers of the engine and conducting the rest of the inefficiently burned products of combustion into said exhaust manifold for mixing with and combustion in the presence of said hot efficiently burned products in said exhaust manifold.

PRIOR ART

The following U.S. Patents are noted:
Wilson, U.S. Pat. No. 1,579,425
Violet, U.S. Pat. No. 2,239,262
Woerner, U.S. Pat. No. 2,701,556
Gau, U.S. Pat. No. 3,579,981
Pischinger, U.S. Pat. No. 3,583,375
Edwards, U.S. Pat. No. 1,933,619
Stivender, U.S. Pat. No. 3,470,857.

BACKGROUND OF THE INVENTION

Conventional four-cycle engines comprise pistons movable in cylinders, and these pistons traverse four stroke cycles in the cylinder for each ignition and power stroke therein and exhaust the intake valves operate in the head end of the respective cylinder for conventional four-stroke inlet and exhaust cycles relative to the movement of the piston in the cylinder. Conventional four-cycle engines, depending upon piston and combustion chamber shape, as well as the placement of the valves and the spark plugs, all operate efficiently to a degree with relation to the combustion of fuel and especially hydrocarbons, as well as other gaseous products. It has been necessary to operate such engines with a substantially rich fuel mixture wherein an excessive amount of hydrocarbon fuel relative to oxygen, is present, so that exhaust gases from such engines usually include a substantial portion of hydrocarbons and unburned gaseous products. Thus, conventional four-cycle engines have been operated with a serious resultant emission contaminating effect on the atmosphere. The necessity for operating conventional four-cycle engines with a rich fuel mixture has been occasioned by a requirement that the valves in the engine do not become overheated and oxidized rapidly. It is well known that conventional four-cycle engines operating on a lean fuel mixture, where there is sufficient oxygen or an overage of oxygen for the consumption of the hydrocarbon fuels, deteriorate rapidly, due to overheating of the exhaust valves and oxidation thereof. While a lean fuel mixture and high temperatures cause exhaust valves to deteriorate rapidly, these conditions also cause nitrogen oxide to be produced at temperatures in excess of 2,750°F. or thereabouts. On the other hand hydrocarbons and carbon monoxides require substantial temperature for efficient burning thereof and fuel that is completely consumed produces only harmless carbon dioxide and accordingly it is well known that it is difficult to compromise between the problems related to the emission of hydrocarbons and carbon monoxide and also nitrogen oxide. Accordingly, it has been necessary to apply various accessories and equipment to the induction and exhaust systems of these engines in order to reduce the foregoing undesirable gaseous emission from the exhaust of thereof.

SUMMARY OF THE INVENTION

The present invention related to a four-cycle internal combustion engine, wherein combustion chambers and cylinders are provided with a head end and with pistons reciprocally mounted therein, and wherein intake and exhaust valves are communicating with the head end of the cylinder and wherein a stratifying exhaust port and valve are disposed in the side wall of the cylinder a substantial distance from the head end of the cylinder so that strata of exhaust gases may be exhausted from areas adjacent the top of the piston to atmosphere, as the piston passes the respective exhaust port in the side wall of the cylinder.

The aforementioned exhaust valve in the head end of the combustion chamber and the cylinder communicates through an exhaust gas recycling conduit with the intake manifold of the engine which communicates with the aforementioned inlet valve at the head end of the cylinder, and flow control valve means controls the flow of the recycled exhaust gases passing through the recycling conduit to the fuel inlet manifold of the invention so as to coordinate the amount of exhaust gas recycled in relation to the amount of fuel mixture conducted through the intake manifold and into the combustion chamber through the intake valve at the head end of the cylinder and combustion chamber The invention also comprises an exhaust valve in the aforementioned port in the side wall of the cylinder for the prevention of raw fuel from escaping from the cylinder during the start of the compression stroke.

The invention also relates to the stratification of exhaust gases in a combustion chamber and cylinder, wherein flame travel moves directly from the spark plug in the head end of the cylinder to the hot surface of the piston and whereby combustion is most efficient at the hot surface of the piston due to the short time interval and due to the efficient atomization of the fuel adjacent the piston, all of which causes efficient combustion at the surface of the piston, whereupon the piston, in moving to the end of its power stroke longitudinally of the cylinder, passes an exhaust port in the side wall of the cylinder and the most efficiently burned products of combustion at the surface of the piston are first exhausted through said last mentioned exhaust port in the side wall of the cylinder to atmosphere, and whereupon the relatively poorly or unburned gases remain in the cylinder at the head end thereof to be recycled through an exhaust valve and back through a recycling conduit to the fuel inlet manifold which communicates with the intake valve in the head end of the cylinder and combustion chamber of the engine. Additionally, some of the relatively poorly or unburned gases are conducted from said recycling conduit through a second conduit to an exhaust manifold which receives hot gases from said exhaust port whereby the portion of the inefficiently burned gases are mixed with hot gases in the exhaust manifold and are thereby burned by the hot gases passing from said exhaust port in the side wall of the cylinder.

The invention comprises a novel method for operating a four-cycle internal combustion engine wherein a multi-cylinder internal combustion engine is operated sequently moving a plurality of pistons in respective cylinders and a rich recycling fuel mixture is introduced into the head end of the cylinders through air intake means and this rich fuel mixture is fired at the hot surfaces of the pistons in the cylinders which causes the pistons to be driven away from the head ends of the cylinders near the ends of the power stroke in the cylinders, then the most efficiently burned gases are exhausted to atmosphere from the surfaces of the pistons at the positions thereof near the ends of the power strokes of the pistons leaving the most inefficiently burned products of combustion in the head ends of the cylinders, then the pistons are moved toward the head ends of said cylinders and the most inefficiently burned products of combustion are exhausted into the intake means of the engine and mixed with a fresh fuel mixture, such that said inefficiently burned products thus mixed produce a rich recycling mixture whereupon the recycling mixture is introduced into the head ends of the cylinders and fired therein. The method also comprises conducting a portion of the rich recycling mixture with the most efficiently burned hot gases during their passage to atmosphere thereby efficiently burning a portion of the rich recycling mixture without adding atmosphere thereto and thereby minimizing the inclusion of nitrogen during the operation of the method as contrasted to prior art utilizing after burners wherein additional atmosphere containing nitrogen is used to burn the inefficiently burned products of combustion exhausted into conventional engine exhaust manifolds from the head ends of the cylinders of conventional four-cycle internal combustion engines.

Accordingly, it is an object of the invention to provide a novel four-cycle internal combustion engine with means for stratifying products of combustion in the combustion chambers and cylinders of the engine so as to exhaust the most efficiently combusted gases to the atmosphere and to recycle the relatively unburned gases for subsequent combustion in the combustion chambers of the engine.

Another object of the invention is to provide a novel four-cycle engine in which the most efficiently combusted fuel products adjacent the surface of a hot piston are efficiently stratified in the combustion chamber and cylinder and are allowed to escape through a port in the side wall of the cylinder in spaced relation to the head end thereof when the piston reaches a position corresponding to a major portion of its power stroke in the respective cylinder.

Another object of the invention is to provide a novel method as hereinbefore set forth. Further objects and advantages of the invention may be apparent from the following specification, appended claims and accompanying drawings.

DESCRIPTION OF THE PREFERRED EMBODIMENTS

Figure 1:
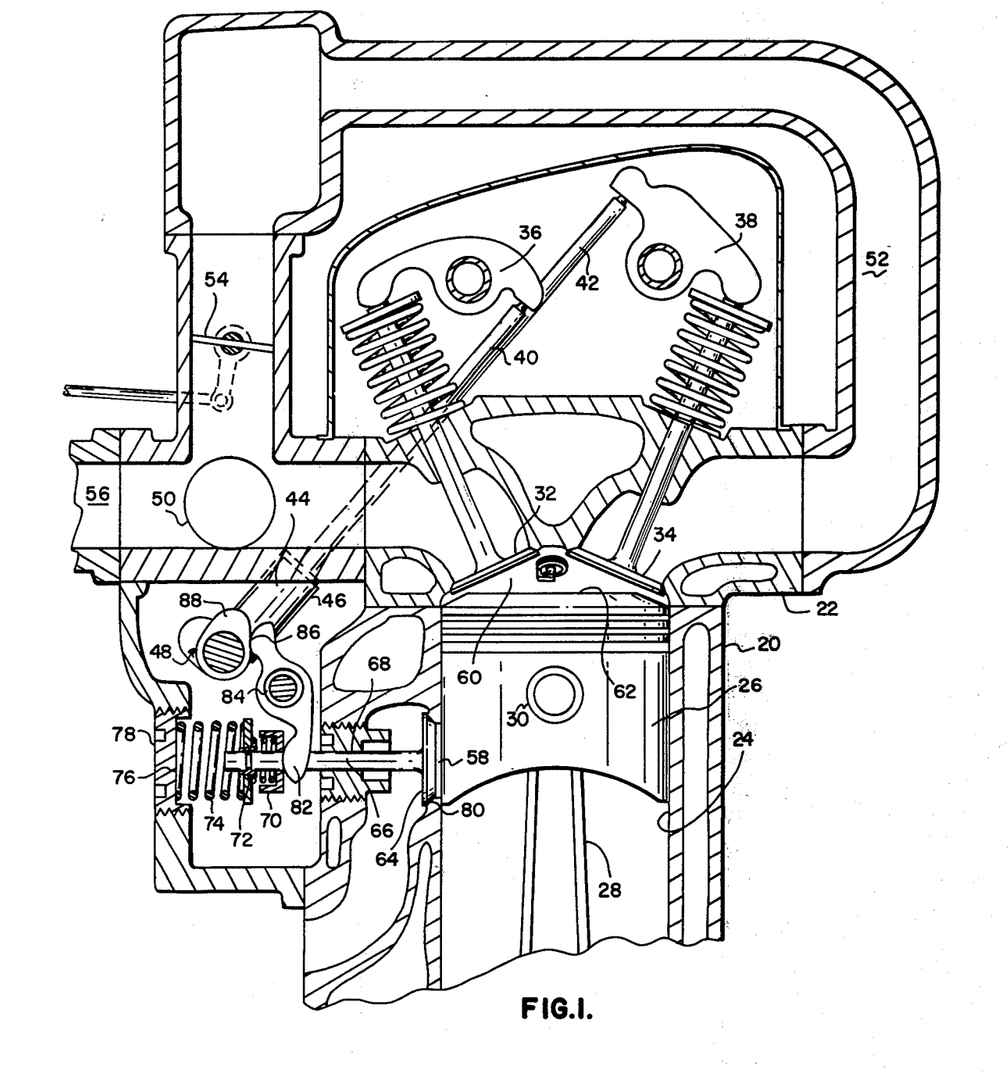
FIG. 1 is a sectional view of a four-cycle internal combustion engine in accordance with the present invention, showing parts and portions in elevation to facilitate the illustration.

As shown in FIG. 1 of the drawings, a four-cycle engine, in accordance with the invention, is provided with a water cooled block 20 having a cylinder head 22 thereon; the block 20 is a multi-cylinder engine having several cylinder bores 24 with respective pistons 26 reciprocally mounted therein and connected to conventional connecting rods 28 by suitable wrist pins 20, the connecting rods 28 being connected with a conventional crankshaft.

The cylinder bore 24 is provided with a head end substantially enclosed by the cylinder head 22 and wherein receptive intake and exhaust valves 32 and 34 are reciprocally operable in the conventional manner by means of respective rocker arms 36 and 38 actuated by means of respective push rods 40 and 42 which are engaged with conventional lifter mechanisms 44 and 46, respectively. These lifter mechanisms 44 and 46 are reciprocally operated by a conventional rotary cam shaft 48 adapted for timed operation of the valves in accordance with the disclosures of operation in FIGS. 2 to 11, inclusive, of the drawings as will be hereinafter described in detail.

The intake valve 32 communicates with an intake manifold 50 which communicates with a plurality of said intake valves 32 at the head end of respective cylinders 24.

Communicating with the exhaust valve 34 is an exhaust gas recycling conduit 52 which communicates with the intake manifold 50' through a flow control valve 54 which is operated in cooperative relation with the throttle of a carburetor 56 which communicates with the intake manifold 50.

Each cylinder 24 is provided with an exhaust port 58 which is spaced a considerable distance from the head end of 60 of each cylinder 24 and this exhaust port 58 communicates with atmosphere and is disposed to be bypassed by the head end 62 of each respective piston 26 as the piston cycles to its fartherest position from the cylinder head 22 and the respective combustion chamber therein.

Communicating with the exhaust port 58 is a poppet valve 64 having a stem 66 reciprocally mounted in a valve guard 68. A spring loaded lifter engaging plate 70 is mounted on the stem 66 adjacent to a keeper 72 holding a compression spring 74 which is abutted at 76 to the valve case 78.

The spring 74 tends to hold the valve 64 on a seat 80 surrounding the port 58 while the lifter engaging plate 70 is adapted to be lifted to puss the valve head off the seat 80 by means of bifurcated valve lifter 82 pivoted on a rocker shaft 84, the lifter 82 having a cam follower portion 86 operable by appropriate lobes 88 on the cam 48. The lobes 88 being timed relative to the stroke of the respective piston 26 to open the valve 64 appropriately in accordance with the disclosures of operation in FIGS. 2 to 11 of the drawings, as will be hereinafter described in detail.

Figure 2:
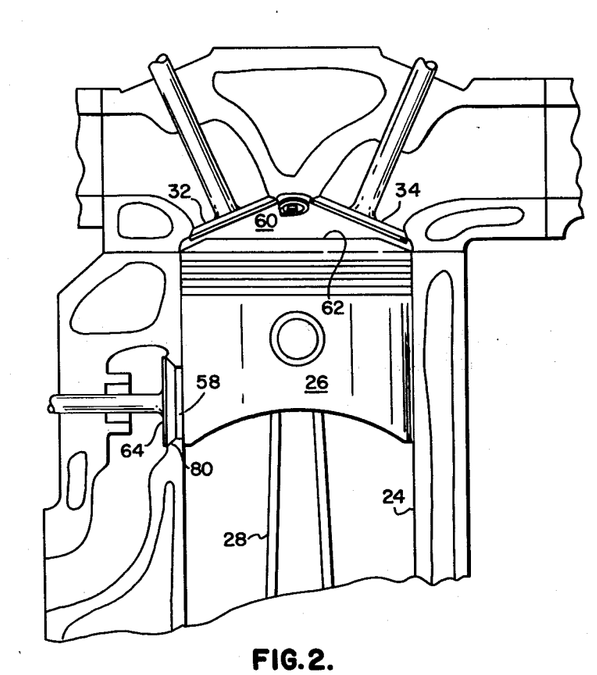
FIG. 2 is a fragmentary sectional view similar to FIG. 1 but showing the piston in op dead center position preliminary to an intake stroke thereof.
Figure 3:
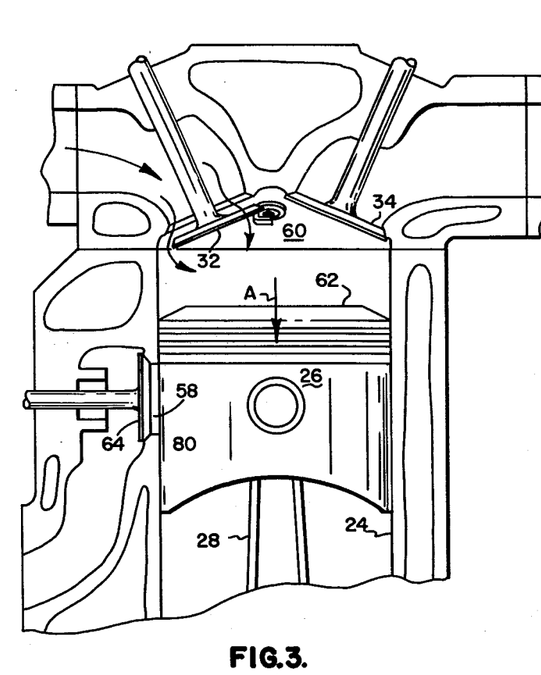
FIG. 3 is a figure similar to FIG. 2, showing a progression of the intake stroke with the piston moving away from the head end of the cylinder and with the inlet valve open admitting a fuel mixture to the combustion chamber.

As shown in FIG. 2, the piston 26 is in top dead center position with both intake and exhaust valves 32 and 34 closed, and with the valve 64 closed against its seat 80. In this position, the piston is at its farthest stroke toward the head end of the cylinder 24 and immediately thereafter the piston moves in the direction as shown in FIG. 3 of the drawings, wherein the intake valve 32 is opened by the cam 48 so that a fuel mixture may flow around the valve 32 and into the combustion chamber at the head end 60 of the cylinder 24 as the piston moves in the direction of an arrow A in FIG. 3 of the drawings.

Figure 4:
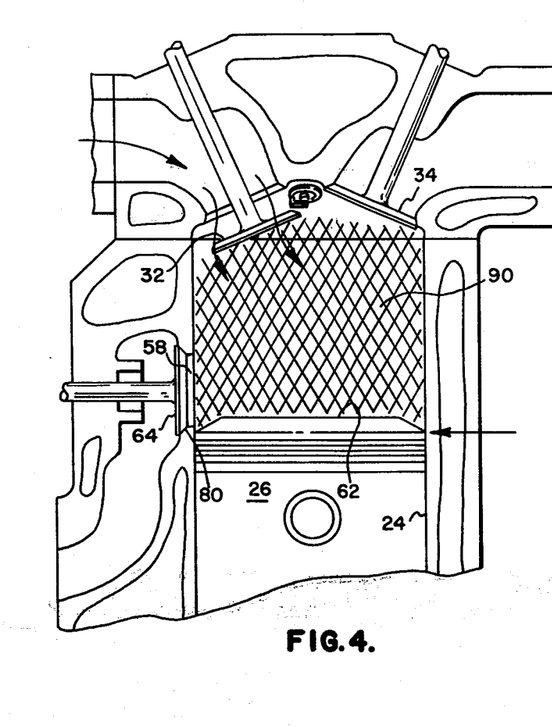
FIG. 4 is a view similar to FIG. 3, showing a completion of the intake stroke with the combustion chamber filled with a fuel mixture and with the intake valve still open but ready to close.

As shown in FIG. 4 of the drawings, the piston subsequently passes from the position shown in FIG. 3 to the furthermost position in its stroke so that the combustion chamber above the piston is filled with a fuel mixture designated 90 in FIG. 4 of the drawings. At this time the intake valve 32 closes to the position shown in FIG. 5 of the drawings, all the while the exhaust valve 64 remains on its seat 80. The piston 26, as shown in FIG. 5, then moves in the direction of an arrow B toward the head end 60 of the cylinder 24, compressing the fuel mixture 90 while both intake and exhaust valves 32 and 34 are in closed position.

Figure 5:
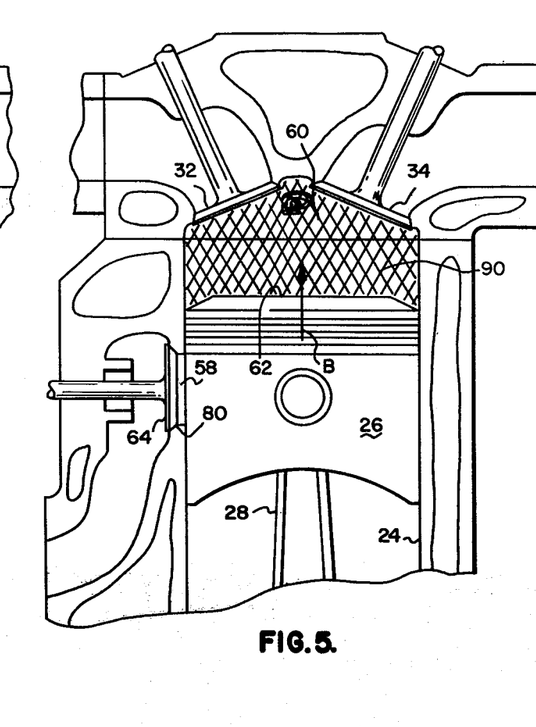
FIG. 5 is a sectional view similar to FIG. 4 but showing a successive compression stroke of the piston toward the head end of the cylinder and showing the intake and exhaust valves in the head end of the cylinder closed.
Figure 6:
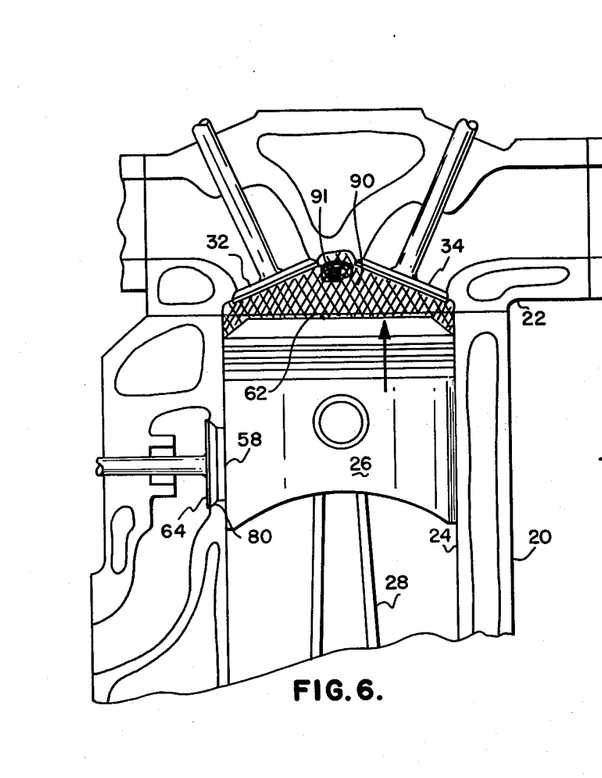
FIG. 6 is another sectional view similar to FIG. 5 showing the fuel mixture compressed in the cylinder and with the piston at a point wherein ignition is accomplished by a spark plug in the head end of the cylinder combustion chamber.

Following the stroke position shown in FIG. 5, the piston progresses to the position shown in FIG. 6, wherein the fuel mixture 90 is fully compressed and ready for ignition by a spark plug 91 in in the cylinder head 22. Following the stroke position of FIG. 6, the piston as shown in FIG. 7 is forced in a direction of an arrow C away from the cylinder head 22 by combustion of the fuel mixture in the upper part of the cylinder 24, while both intake and exhaust valves 32 and 34 remain closed.

Figure 7:
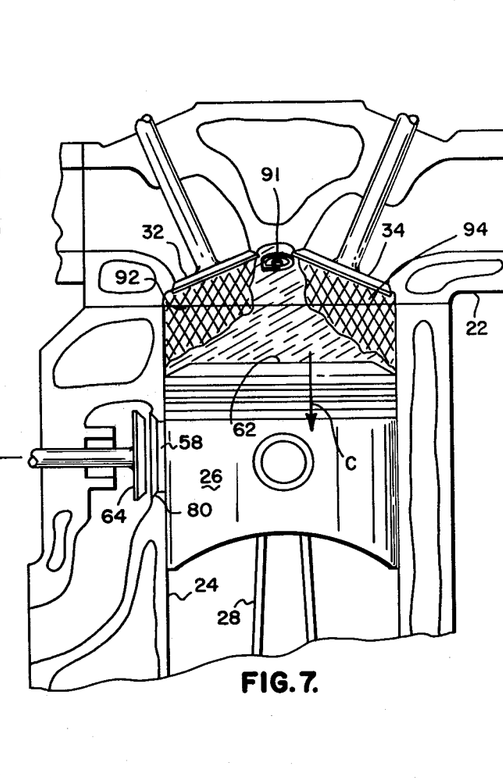
FIG. 7 is a sectional view similar to FIG. 6, showing a power stroke of the piston in the cylinder resulting from ignition of the fuel mixture in the combustion chamber by the spark plug and showing the flame travel and relative stratification of products of combustion where combustion is most efficiently attained at the surface of the piston due to its relatively higher temperature than that in the surrounding combustion chamber area.

It will be seen that the spark plug 91, when fired, causes flame to travel directly to the upper surface or head end 62 of the piston 26, due to the fact that the piston at its surface 62 is generally at a higher temperature than other areas of the engine due to the fact that these other areas are water cooled, as for example, the cylinder head 22 and block 20 surrounding the cylinders 24 are all water cooled and heat must flow from the piston 26 to these areas; consequently, the temperature on the surface 62 of the piston forms a relatively hot combustion chamber surface which tends to provide most favorable burning conditions for the fuel mixture 90 compressed in the position as shown in FIG. 6, and subsequently substantially ignited and expanded as shown in FIG. 7.

It will be appreciated by those skilled in the art that since the surface 62 of the piston 26 is at higher temperature than the remaining combustion chamber areas, generally speaking, the fuel mixture on the surface 62 of the piston will be burned at the highest temperature and will be most efficiently burned.

Figure 8:
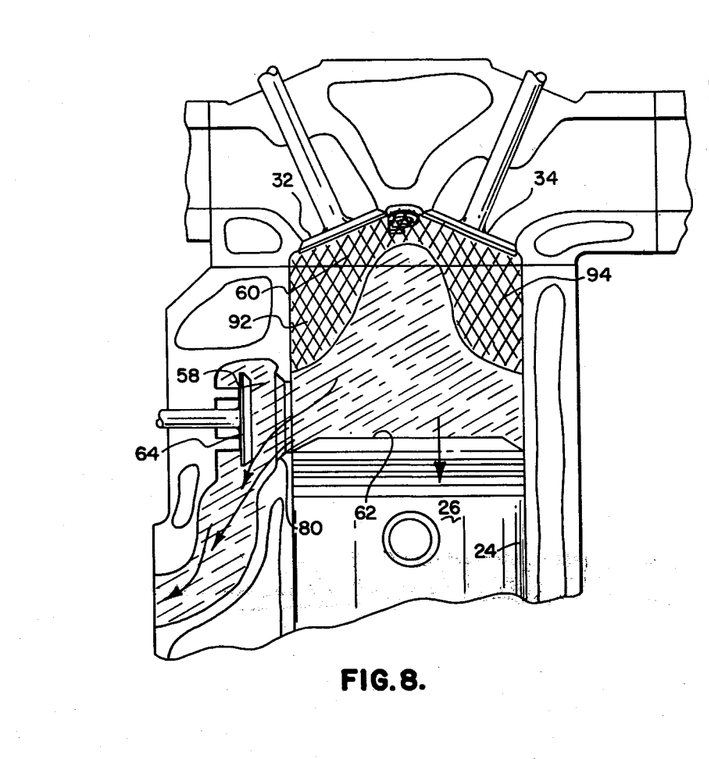
FIG. 8 is a view similar to FIG. 7, showing the most efficiently burned gases escaping through a port in the side wall of the cylinder as the piston reaches a position in its power stroke which is equal to a major portion of the stroke, and also showing a stratification between the most efficiently burned gases passing out the exhaust port in the side wall of the cylinder and the relatively unburned products of combustion in the combustion chamber end of the cylinder.

When the piston 26 is driven by combustion pressure of the fuel mixture 90 under combustion, as shown in FIG. 7, the piston moves in the direction of the arrow C and at this time the cam 48 opens the exhaust valve 64 from its seat 80 around the port 58, and as the head end 62 of the piston 26 moves to a position as shown in FIG. 8 of the drawings, this end 62 of the piston 26 passes the port 58 with the valve 64 open and allows the most completely combusted gases to escape through the port 58 to atmosphere from the head end 62 of the pistion 26. It will be seen from FIGS. 7 and 8 that portions of the gases designated 92 and 94 at opposite sides of the spark plug 91 are not burned as efficiently as the gases near the hot surface 62 of the piston 26. Accordingly, these gaseous portions 92 and 94 in the head end of the cylinder, even though they expand toward the piston, do not pass outwardly through the exhaust port 58, all as shown in FIGS. 8 and 9 of the drawings.

The piston 26, shown in FIG. 8 of the drawings, is in its farthest stroke position from the head end of the cylinder 24, and the piston then progresses in the direction of the arrow B toward the head end 60 of the cylinder 24, and at this time the valve 64 is moving toward closed position with respect to the seat 80 surrounding the port 58.

Figure 9:
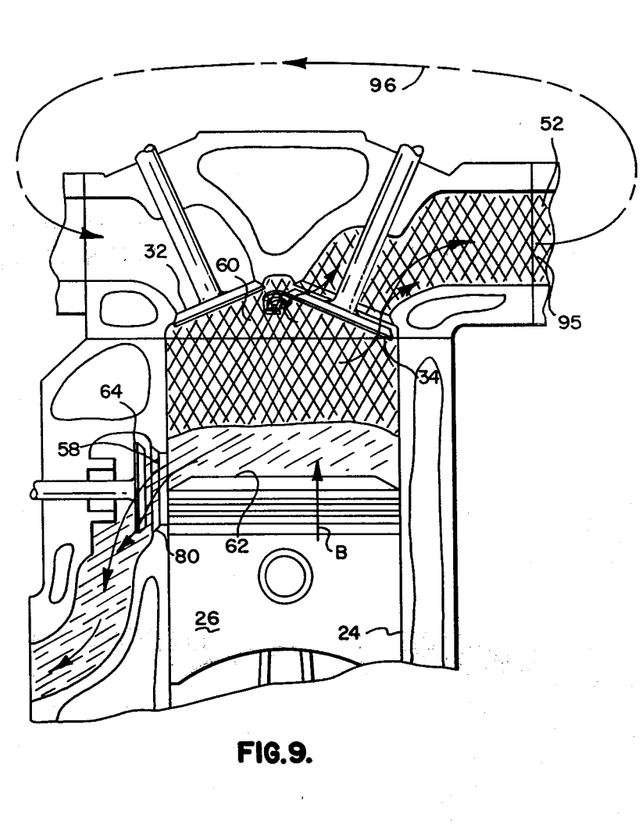
FIG. 9 is a view similar to FIG. 8 showing a successive movement of the piston toward the combustion chamber head end of they cylinder and showing an exhaust valve in the head end of the cylinder open to allow recycling of the relatively unburned products of combustion through a recycling conduit to the intake manifold of the engine.
Figure 10:
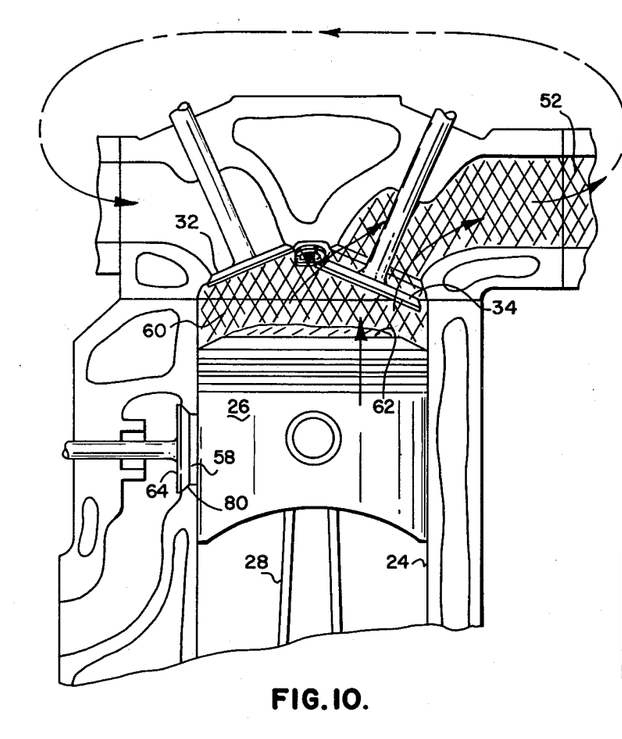
FIG. 10 is a sectional view similar to FIG. 9 showing a continued exhaust gas recycling operation through the exhaust valve in the head end of the cylinder.

As the piston 26 moves in the direction of the arrow B in FIG. 9 the exhaust valve 34 is opened to allow substantially unburned hydrocarbons 95, from the gaseous portions 92 and 94, to pass into the recycling conduit 52 and through the valve 54 to the intake manifold 50, all as indicated by a broken line 96 in FIG. 9 of the drawings.

Accordingly, the most efficiently burned products of combustion from the surface 62 of the piston pass outwardly through the exhaust port 58 to the atmosphere, and the relatively inefficiently combusted gases containing hydrocarbons remain in the head end 60 of the cylinder and are exhausted through the recycling conduit 52 to the intake manifold 50.

Figure 11:
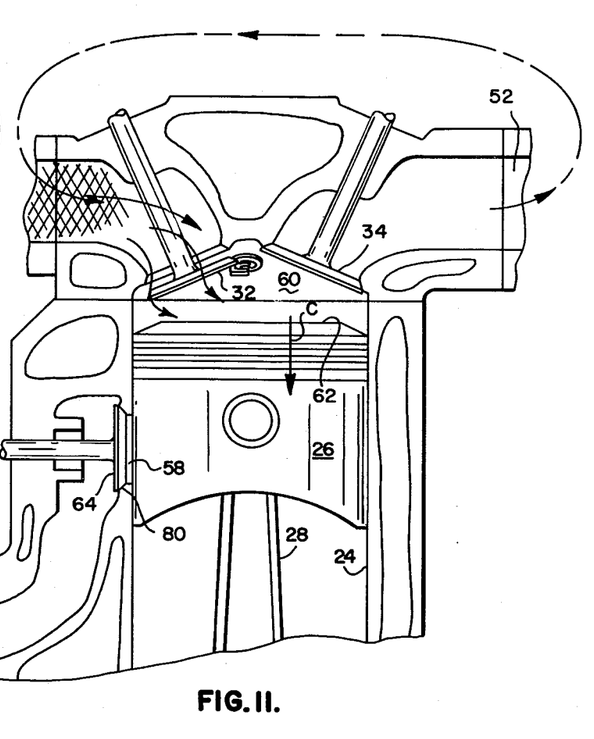
FIG. 11 shows a subsequent intake stroke of the piston with the intake valve open and the recycling of the previously recycled exhaust gases mixed with fresh fuel from the intake manifold of the engine.

During this recycling of inefficiently combusted fuel products to the intake manifold 50, the relatively unburned hydrocarbons are mixed with fresh fuel mixtures passing through the mainfold 50 and are then ready for induction into the head end 60 of other ones of the cylinders 24 through their respective intake valves 32, as shown in FIG. 11 of the drawings. At this time, the respective piston 26 is moving in the direction of the arrow C in FIG. 11 of the drawings, and fresh fuel mixed with unburned products of combustion are induced into the combustion chamber as the piston 26 moves in the cylinder 24 to create a partial vacuum therein. Subsequently, the mixture of fresh fuel and unburned hydrocarbons is combusted in a manner as hereinbefore described relative to FIGS. 6 and 7 of the drawings.

Figure 12:
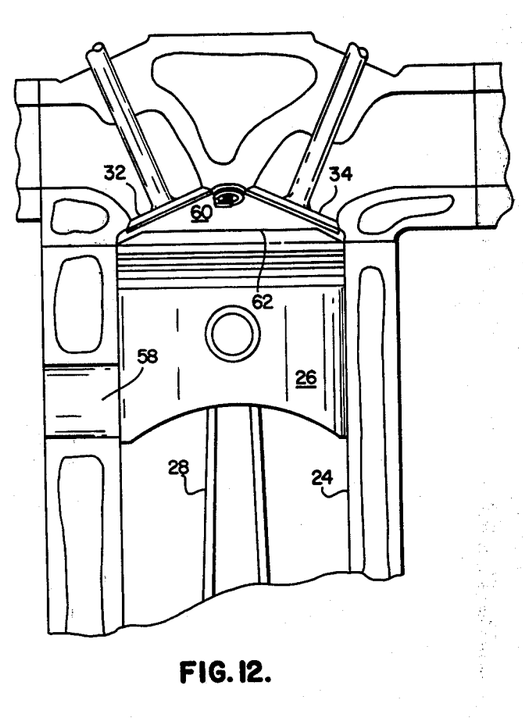
FIG. 12 is a view similar to FIG. 1 but showing a modification of the invention wherein an exhaust port in the side wall of the cylinder substantially spaced from the head end thereof is open to the atmosphere and not controlled by an exhaust valve.

In the modification as shown in FIG. 12 of the drawings, the port 58 is not provided with a valve 64, and accordingly, this combination of elements may be arranged to operate in a similar manner to that hereinbefore described when certain proportions of the engine, including bore and stroke, and the disposition of the exhaust port is such that movement of the piston toward the head end of the cylinder after the fuel intake stroke, will not cause substantial losses of the raw fuel mixture through the port 58. This intake and compression function of the structure, as shown in FIG. 12 of the drawings, will be dependent upon proportions of the engine and the relative disposition of the port 58 and the stroke of the piston 26 so as to permit efficient exhaustion of most efficiently burned gases and yet to prevent the loss of raw fuel mixture from the port 58 after the intake stroke and during the compression stroke previous to ignition of the fuel charge, generally as indicated in FIGS. 6 and 7 of the drawings.

Figure 13:
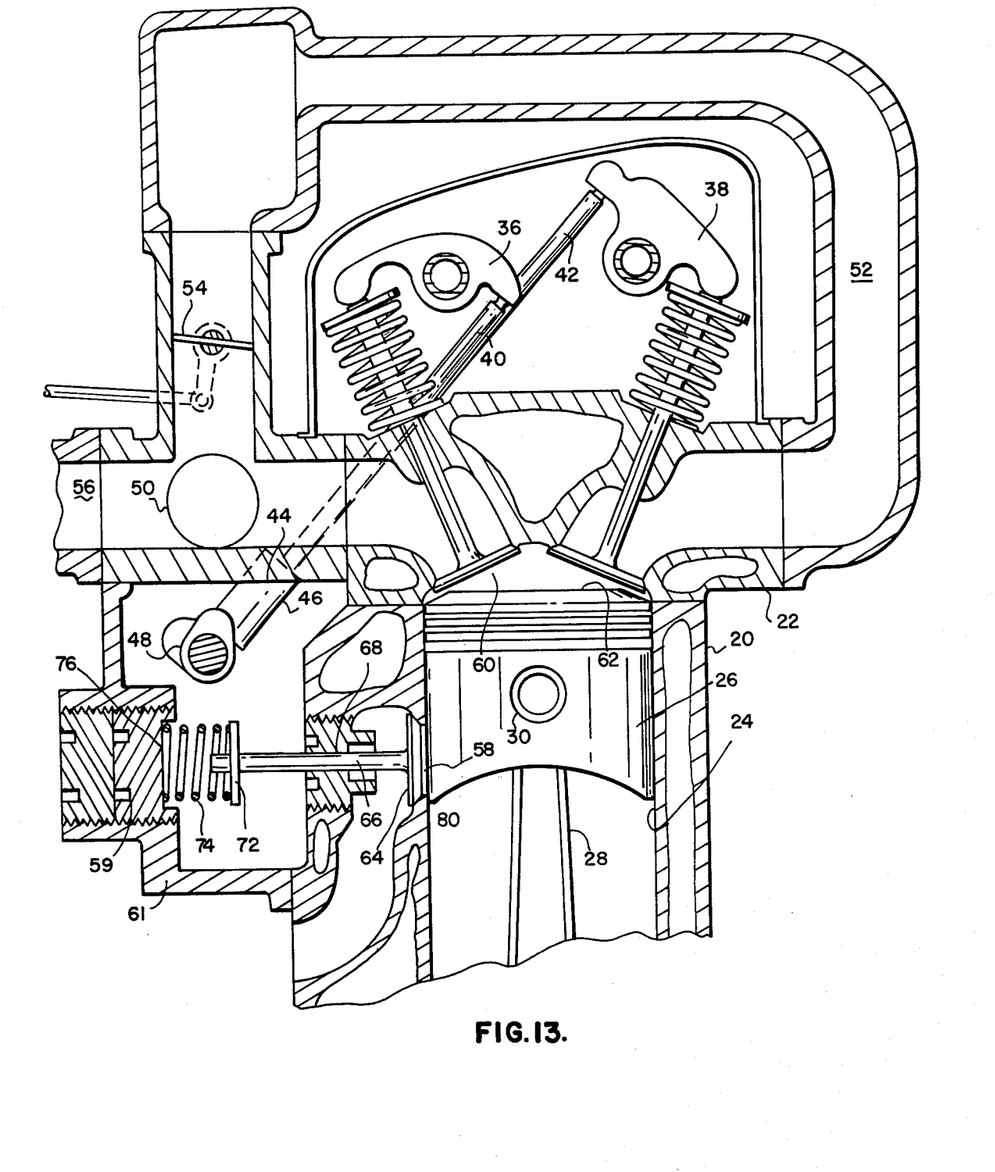
FIG. 13 is a view similar to FIG. 1 showing a modified form of the invention wherein a spring loaded exhaust valve is disposed to be opened by power stroke gas pressures at a position near the end of the piston power stroke in a respective cylinder of the engine.

As shown in FIG. 13, a modified form of the engine of the invention comprises the poppet valve 64 and spring 74 tending to hold the poppet valve 64 closed agains the seat 80 and an adjustable plug 59 is crew threaded in the housing 61 so as to adjust compressive force of the spring 74 and thereby adjusting the force of the head of the valve 64 against the seat 80 so that the valve can be adjusted to respond to nominal pressure in the cylinder 24 when the piston 26 reaches a position near the end of its power stroke wherein the upper surface 62 of the piston bypasses the port 58. As hereinbefore described, the valve 64 only serves to prevent a fuel mixture from escaping through the port 58 following the intake stroke and during compression of the fuel in the cylinder preliminary to the firing stroke or power stroke. Accordingly it will be appreciated then that the pressure of the valve 60 on the seat 80 may be light and that the spring 74 may be adjusted to tune the exhaust to desired low pressure forces required for opening the valve and yet to maintain the valve closed during the initial compression stages of the fresh fuel charge in the cylinder 24 by the piston 26.

It will be appreciated that the spring loaded valve 64 as shown in FIG. 13, is not limited by any cam operation and is so adjusted that it will open readily under engine load, but when the carburetor throttle valve is closed on normal vehicle deceleration, the exhaust valve 64 remains closed and does not allow any fuel mixture of products to escape to the atmosphere through the port 58. Further, it will be appreciated that when the engine is under load and high power stroke pressures in the cylinder 24, that the valve 64 will operate rapidly without any cam limitations and therey obviate the usual valve erosion problems attendant to the positive operation of valves by means of cams or the like.

It will be appreciated that the spring loaded valve 64, as shown in FIG. 13, when properly loaded by the spring 74, simplifies emission control normally attendant to the deceleration of an engine where the throttle of the carburetor 56 is closed and the engine is coasting down hill for example.

Additionally, it will be understood that the valve 54 provides for continuous recycling when the engine is operating under power but may be closed when the throttle of the carburetor is closed so that the inefficiently burned gaseous products will remain in the conduit 52 until the carburetor throttle is again opened for admitting a fuel mixture to the respective engine combustion chambers.

The valve 54 will be controlled in cooperation with the usual control valve of the carburetor 56 so as to provide for sufficient negative pressures at the carburetor for proper fuel mixture induction and also to provide for the recycling of an appropriate amount of the inefficiently burned products through the conduit 52 back to the engine intake manifold 50 for recycling and reintroduction of the recycling through the valve 32 and into the appropriate combustion chamber 60.

Figure 14:
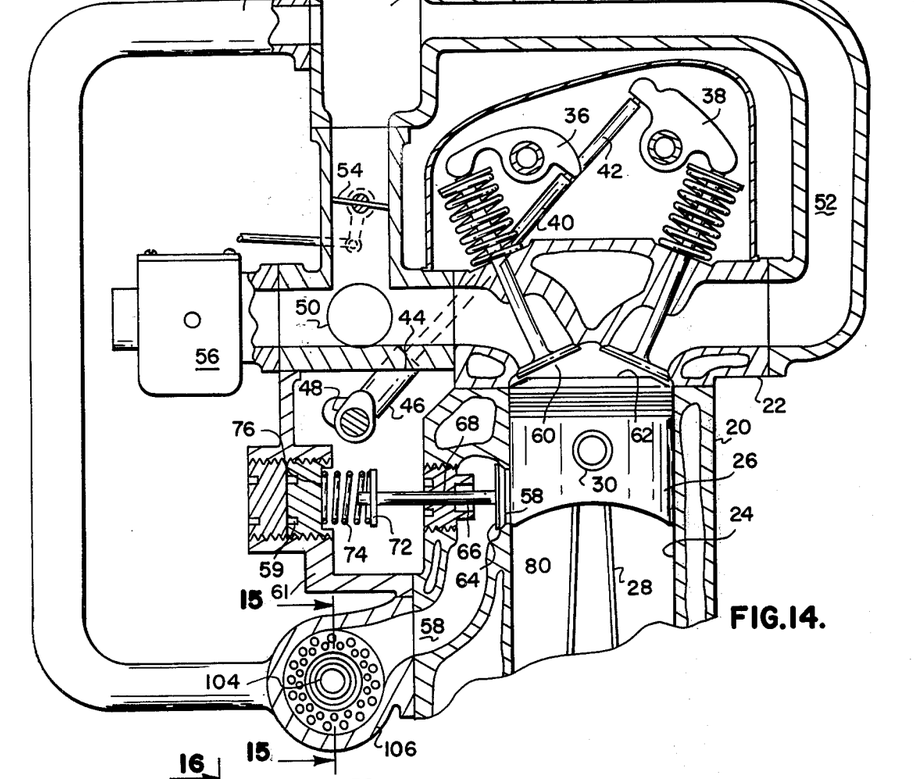
FIG. 14 is a fragmentary sectional view similar to FIG. 13 but showing an additional means for combusting inefficiently burned products of combustion exhausted from the head end of an internal combustion engine cylinder.
Figures 15, 16:
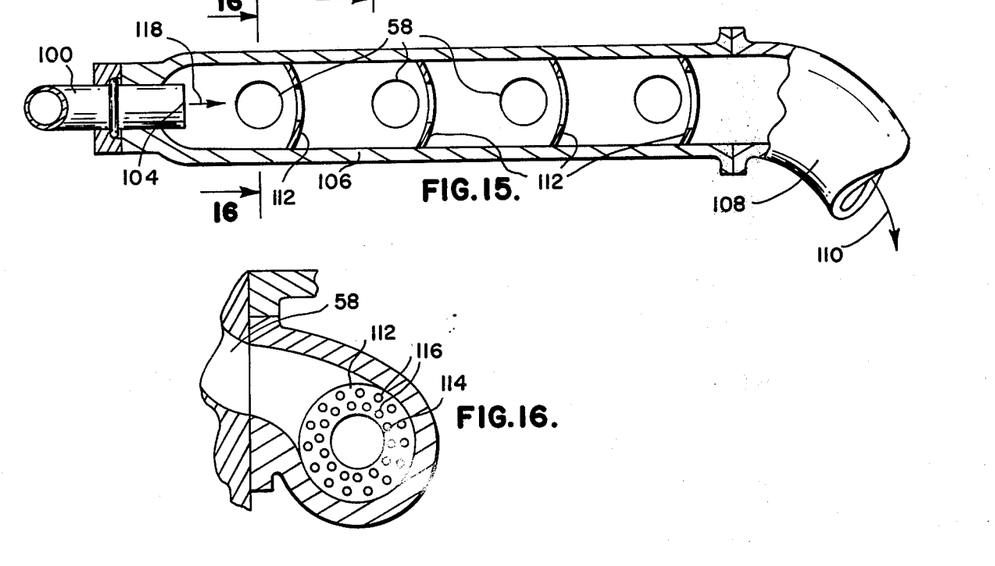
FIG. 15 is a fragmentary sectional view taken from the line 1515 of FIG. 14.
FIG. 16 is a sectional view taken from the line 1616 of FIG. 15.

As shown in FIGS. 14, 15 and 16, an additional exhaust gas burning means is incorporated in the structure shown in FIG. 13. The disclosure of FIG. 13 is hereby incorporated in FIG. 14 and the structure shown in FIG. 14 additionally comprises a second exhaust conduit 100 which communicates through a chamber 102 with the exhaust gas recycling conduit 52. This second exhaust gas conduit 100, as shown in FIGS. 14 and 15, is provided with an outlet end 104 communicating with the interior of an exhaust gas manifold 106 which receives exhaust gases from the ports 58 and coupled to the exhaust manifold 106 is a tail pipe 108 which communicates with atmosphere as indicated by the arrow 110.

The exhaust gas manifold 106 is provided with combuster baffles 112, each of which is disposed downstream relative to a respective port 58.

As shown in FIGS. 15 and 16, each combuster baffle 112 is disc shaped and provided with a central opening 114 through which exhaust gases may pass. Additionally, openings 116 in each baffle 112 provide for mixing of gases namely the inefficiently burned gases issuing from the end 104 of the exhaust conduit 100 and the hot efficiently burned gases passing from the ports 58.

The inefficiently burned gases passing as indicated by arrows 118, are induced at right angles to the gases passing from ports 58 and cause turbulent mixing whereupon the gases mix and pass through the openings 114 and 116 of the combuster baffles 112 and the successive functions of mixing cause very efficient mixing of the inefficiently burned gases 118 with the hot efficiently burned gases 58 thereby causing efficient re-burning or after burning of the inefficiently burned exhaust gases 118 passing from the end 104 of the exhaust gas conduit 100. Accordingly, it is not necessary to add atmospheric air to burn the inefficiently burned gases 118 whereby introduction of additional nitrogen is avoided, and whereby the unburned hydrocarbons are efficiently combusted out of the inefficiently burned exhaust gases 118 by means of the high temperature exhaust gases which are exhausted from the ports 58. Accordingly, the structure of the invention as shown in FIGS. 14, 15 and 16 accomplishes efficient after burning of the exhaust gases without introducing additional atmospheric air laden with nitrogen.

With reference to FIG. 14 of the drawings, it will be seen that the valve 54 controls the amount of the rich recycling mixture passing from the conduit 58 into the intake manifold downstream of the carburetor 56. The valve 54 may be adjusted for various operating conditions to divide the flow of the inefficiently burned products of combustion to the intake manifold 50 and the second exhaust conduit 100, and accordingly, the inefficiently burned products of combustion which are not recycled to the intake manifold, are efficiently burned in the exhaust manifold 106, all as hereinbefore described.

The method of the invention comprises a method for operating a multi-cylinder four-cycle internal combustion engine wherein the engine is provided with a plurality of cylinders having sequentially movable pistons which are moved in the usual sequence relative to each other for intake, compression, power and exhaust strokes. The method comprises the introduction of a rich recycling fuel mixture into the head end of the respective engine cylinders through an intake means and firing of the rich recycling fuel mixture at the hot surfaces of the pistons in the cylinders and driving the pistons away from the head ends of the cylinders to positions near the ends of the power strokes in the cylinders, then exhausting to atmosphere through an exhaust manifold, the most efficiently burned products of combustion from the surfaces of the pistons at said positions near the ends of the power stroke of the pistons while leaving the most inefficiently burned products of combustion in the head ends of the cylinders, then moving the pistons toward said head ends of said cylinders and exhausting some of the most inefficiently burned products of combustion from the cylinders into said intake means of said engine and mixing a fresh fuel mixture with said inefficiently burned products therein to produce said rich recycling mixture; the introducing said rich recycling fuel mixture into the head ends of said cylinders and firing said rich recycling fuel mixture therein; and also conducting the rest of the inefficiently burned products of combustion into said exhaust manifold and thus burning the rest of said inefficiently burned products of combustion by heat of the efficiently burned products of combustion in said exhaust manifold whereby the inefficiently burned products of combustion are after burned in the exhaust manifold 106 without the necessity of adding additional atmospheric air and the attendant problems relating to the nitrogen content thereof.

It will be obvious to those skilled in the art that various modifications of the invention may be resorted to without departing from the spirit thereof.

I claim:

1. In a four-cycle internal combustion engine, the combination of: a cylinder having a head end and a crankcase end; a piston reciprocally mounted in said cylinder; a fuel inlet valve communicating with said head end of said cylinder; said cylinder having an exhaust outlet opening in the sidewall thereof; said exhaust outlet opening communicating with atmosphere and being spaced from said head end of said cylinder a distance equal to a major portion of the stroke of said piston in said cylinder; an exhaust outlet valve disposed in communication with said head end of said cylinder; a recycling conduit means communicating between and with said exhaust outlet valve and said fuel inlet valve; an exhaust manifold through which said outlet opening communicates with atmosphere; and a second exhaust conduit communicating with said first recycling conduit; said second exhaust conduit also communicating with the interior of said exhaust manifold; and valve means adapted to divide flow from said first recycling conduit into said fuel inlet valve and said exhaust conduit.

2. The invention as defined in claim 1, wherein: an exhaust outlet valve is disposed to control flow of exhaust gases through said exhaust outlet opening in the sidewall of said cylinder.

3. The invention as defined in claim 1, wherein: rotary cam means is provided for opening said fuel mixture inlet valve once during each four strokes of said piston in said cylinder.

4. The invention as defined in claim 2 wherein: rotary cam means is provided for opening said exhaust outlet valve once during each four strokes of said piston in said cylinder.

5. The invention as defined in claim 2, wherein: rotary cam means is provided for opening said fuel inlet valve and said exhaust outlet valve once during each four strokes of said piston in said cylinder; said rotary cam means being timed to operate said fuel inlet valve at one down stroke cycle of said piston in said cylinder and adapted for operating said exhaust outlet valve at an apppropriate stroke of said piston when moving toward said head end of said cylinder.

6. The invention as defined in claim 1, wherein: said spring loaded valve is provided with a spring adapted normally to hold said exhaust outlet open and closed and adapted to be opened by exhaust pressure in said cylinder.

7. The invention as defined in claim 1, wherein: turbulator means in said exhaust conduit is disposed for mixing gases passing from said second recycling conduit with gases passing outwardly from said exhaust outlet openings.

8. The invention as defined in claim 6, wherein: means is provided for adjusting the spring load tending to hold said spring loaded valve closed.

* * * * *